Feb. 8, 1966  H. OBERTHÜR  3,233,947
LOAD RESPONSIVE VEHICLE-BRAKE REGULATOR
Filed Jan. 18, 1965  5 Sheets-Sheet 1

Heinrich Oberthür
INVENTOR.

BY

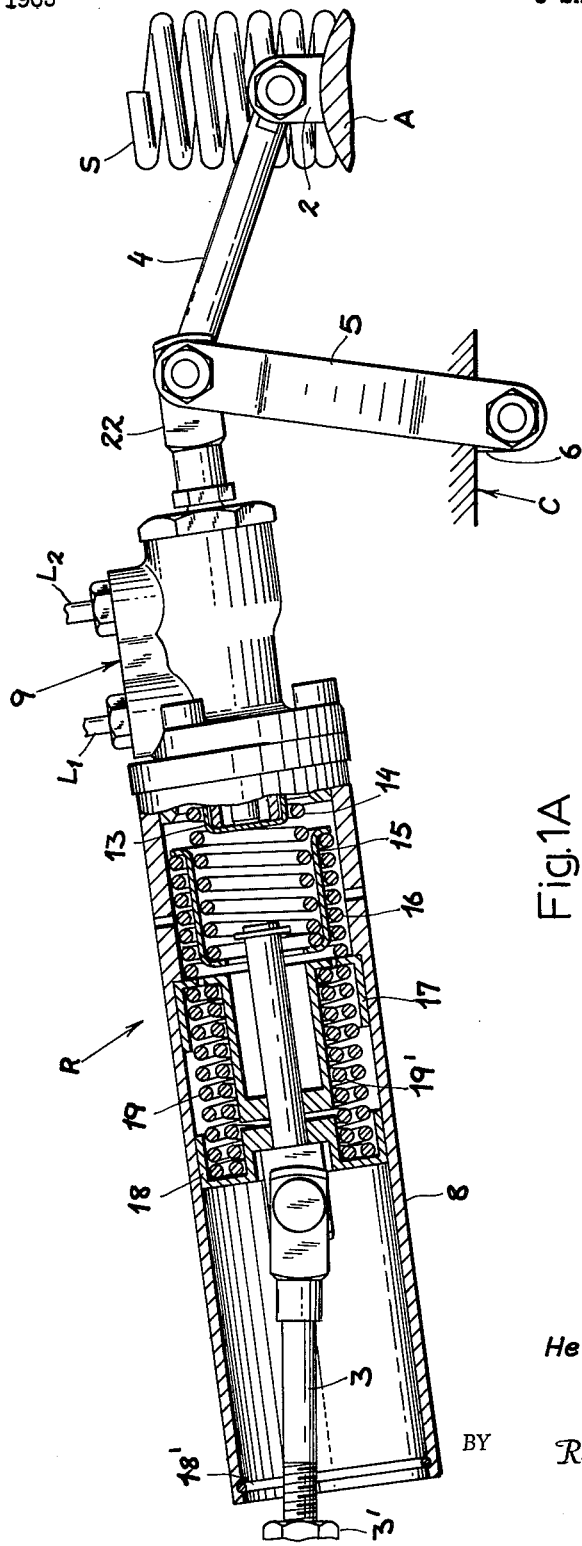

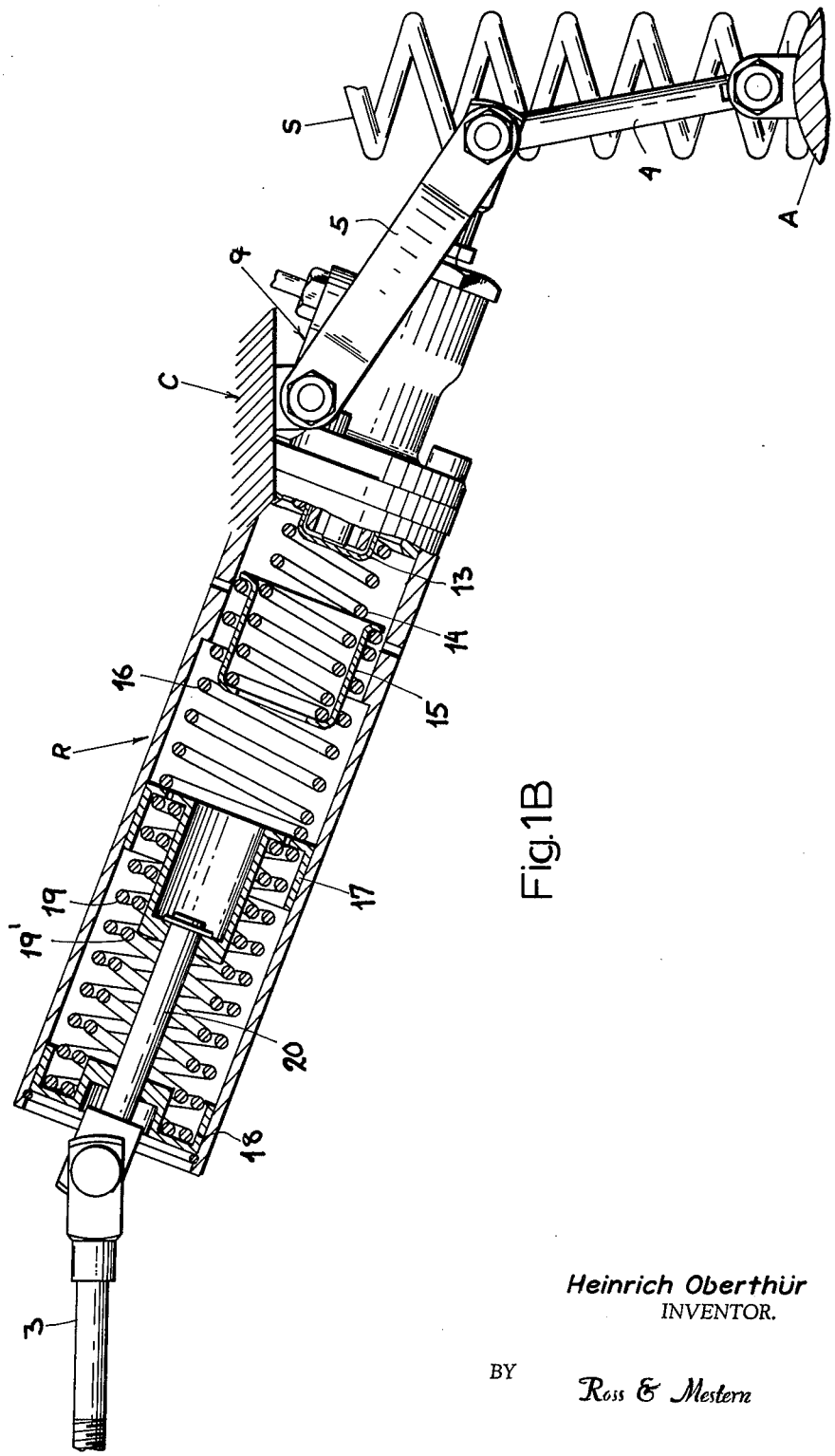

Feb. 8, 1966     H. OBERTHÜR     3,233,947
LOAD RESPONSIVE VEHICLE-BRAKE REGULATOR
Filed Jan. 18, 1965     5 Sheets-Sheet 4
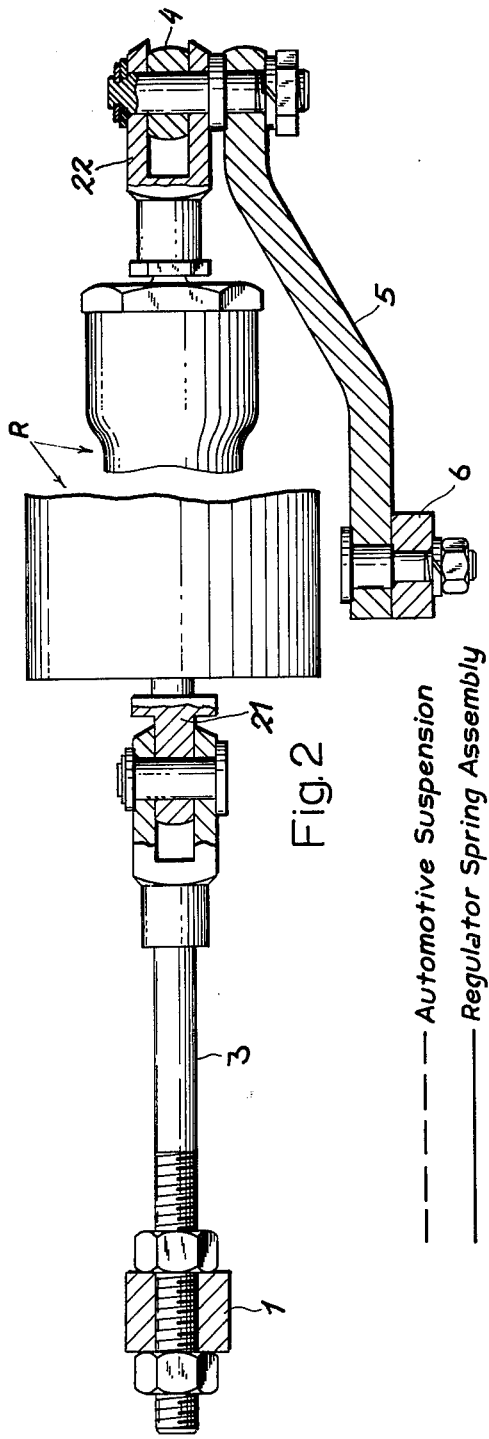
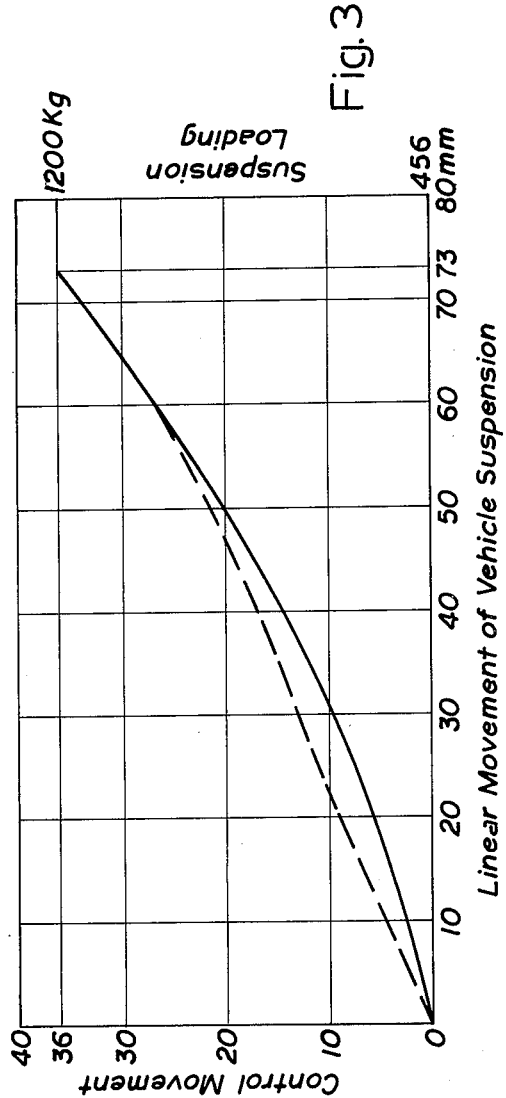
INVENTOR:
Heinrich Oberthür
BY
Ross & Mestern

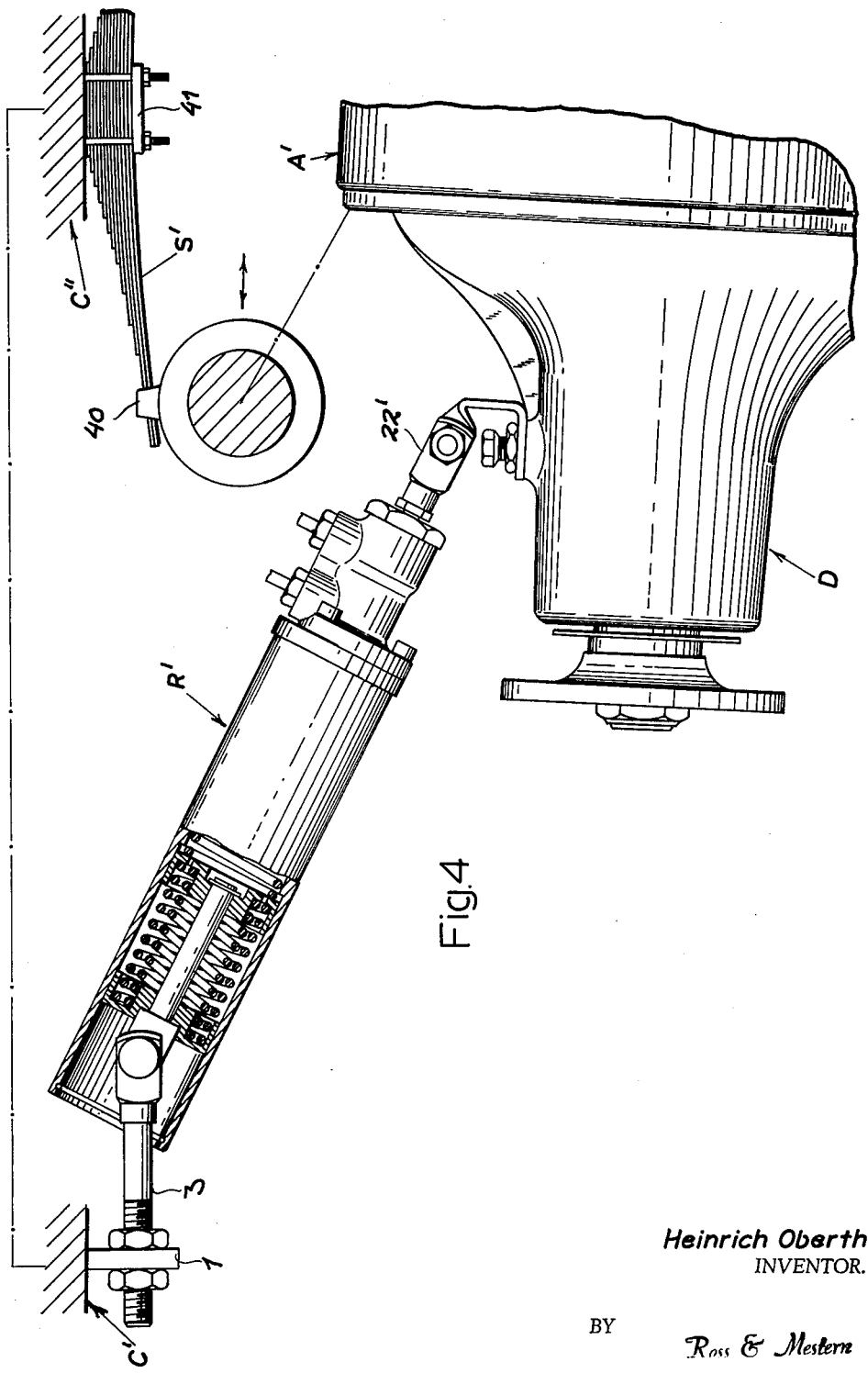

United States Patent Office 3,233,947
Patented Feb. 8, 1966

3,233,947
LOAD RESPONSIVE VEHICLE-BRAKE REGULATOR
Heinrich Oberthür, Offenbach am Main, Germany, assignor to Alfred Teves KG., Frankfurt am Main, Germany, a corporation of Germany
Filed Jan. 18, 1965, Ser. No. 426,038
Claims priority, application Germany, Jan. 20, 1964, T 25,463
9 Claims. (Cl. 303—22)

This application is a continuation-in-part of my copending application Ser. No. 217,609, filed August 17, 1962, now Patent No. 3,169,800, and entitled Brake Regulator.

My present invention relates to a braking-force regulator of the general type described and claimed in the aforementioned copending application and, more particularly, to a regulator responsive to the degree of loading of the vehicle for modifying the force applied to the wheel brakes as the brake pedal or other actuator is displaced.

In my above-identified application, I describe a regulator interposed between the master cylinder of an automotive vehicle and the wheel-brake cylinders thereof for the automatic adjustment of the braking force applied to the wheel brakes as the brake pedal is depressed. The regulator, whose valve member is displaceable under the hydraulic pressure developed at the master cylinder, is designed to prevent premature locking of the wheels of an automotive vehicle during braking to prevent slippage or skidding. The valve member thus may be a differential piston provided with a poppet-type check valve normally urged into engagement with a valve seat in which hydraulic fluid flow is restricted until a relative displacement is effected between the valve member and the seat. This relative displacement can derive, at least in part, from the application of fluid pressure to the valve seat which, as described in the copending application, can constitute a differential piston resiliently biased in one direction and urged hydraulically in the other. This piston can include a poppet valve engageable with an abutment during the early stages of actuation of the brake pedal so that hydraulic fluid passes through the differential piston and, as braking commences, via the hydraulic pressure of the master cylinder shifts the differential piston to close progressively the valve and finally withdraw the poppet-valve member from its engagement with the abutment. Further application of pressure to the piston will cause the transmission of force to the wheel-cylinder side thereof. If the piston has a relatively small effective surface area on the master-cylinder side and a relatively large effective surface area on the wheel-cylinder side, the pressure applied at the wheel cylinders will be reduced and premature locking of the brake prevented. The point at which the regulator is effective to reduce the pressure applied to the wheel cylinders, i.e., the master-cylinder pressure resulting in substantially complete closure of the poppet valve, is established by the restoring force of spring means acting counter to the direction in which the differential piston is displaced to close the valve.

In other regulator systems and in the one described above, it has been found to be desirable to provide means for controlling the restoring force applied to the movable valve member in accordance to the load carried by the wheels of the vehicle. In my copending application, the vehicle-suspension system includes a fluid cushion or support for the vehicle which adjusts, via a piston-and-cylinder arrangememnt, the force applied to the movable member, i.e. the seat-forming differential piston. In such brake regulators, one generally has provided, heretofore, mechanical means or other systems capable of resisting displacement of the movable member or effecting such displacement at a variable rate determined by the load carried by the wheels of the vehicle. The importance of such an arrangement, which prevents locking of the wheels by reducing the pressure applied thereto upon actuation of the brake pedal, cannot be underestimated since under relatively large loads it is necessary to reach a higher braking pressure before the changeover point than when lighter loads are carried, if skidding is to be prevented and effective braking to be permitted.

It is a common difficulty in systems of the type described above, in which the relative movement of the chassis and the wheel axle, against the force of the vehicle springs or other shock-absorbing resilient suspension, is exploited to adjust the movable member of the regulator, that a given increment of relative movement in this sense does not provide the required hydraulic displacement or force. In other words, the brake regulator must be constructed differently for each vehicle with which it is to be used or some form of compensator must be provided between the vehicle chassis and axle on the one hand and the movable brake regulator member on the other to so co-ordinate the incremental change in the chassis-axle displacement to the required incremental change of the restoring force applied to the movable member of the regulator as to insure that the regulator valve responds in the optimum manner.

It is the principal object of the present invention to provide a braking-force regulator for automotive vehicles and the like, which includes a valve interposed between a master cylinder and the wheel cylinders of the vehicle, whereby the force applied to the movable member of the valve means can be adjusted in a convenient manner and in response to the load carried by the vehicle wheels or axles.

Still another object of this invention is to provide an improved brake regulator of the character described having relatively simple and inexpensive means for automatically adjusting the restoring force applied to the movable valve member in response to changes in the loading of the vehicle suspension.

These objects and others which will become apparent hereinafter are attained, in accordance with the present invention, by a braking-force regulator for an automotive vehicle which includes a valve means in a hydraulic path between a master-brake cylinder and the fluid-responsive wheel cylinders of a vehicle, the valve means including a pressure-responsive movable member for controlling the flow of fluid from the master-cylinder means to the wheel-brake means, and at least a pair of resilient means in tandem between a connecting element and one of the relatively movable portions of the vehicle suspension, the resilient means proximal to the movable valve member having a stiffness in excess of that of the resilient means remote therefrom. Another connecting member is provided between the housing of the valve means and the other portion of the suspension. Thus, the regular assembly including the housing means, valve means and resilient means are interposed between a pair of connecting members one of which is secured to a first portion of the suspension, e.g. the vehicle chassis or an element affixed thereto, while the other connecting member is joined to the axle of the vehicle or some element mounted thereon. For the purposes of the present invention, the suspension system of the vehicle will be considered to include the chassis and the axle, which are vertically movable relative to one another and any spring means interconnecting them (e.g. pneumatic or hydraulic shock absorbers or dash pots, torsion bars, coil springs, leaf springs). It is evident that the relative displacement of the axle element (i.e. any element in fixed relationship to the wheel axis) and the chassis element (any element in fixed relationship to the chassis) can be transformed into a loading of the resilient means which are connected in tandem, as previously noted, so that the resilient means of lesser stiffness coefficient compresses in preference to the resilient means of higher stiffness coefficient. If the low-stiffness and high-stiffness resilient means are considered in terms of compression springs, free from friction and interposed between a pressure element and the valve member, it will be seen that the application of an axial force F to the springs in tandem will compress the low-stiffness spring by a distance $x_1 = F/k_1$ where $k_1$ is the stiffness coefficient of the more compressible spring. Since the same force is transmitted to the less compressible spring having the higher stiffness coefficient $k_2$, its linear compression $x = F/k_2$.

The total axial displacement of the tandem springs and, thus of the control member compressing same will be $X = x_1 + x_2$ while displacement of the stiff spring bearing upon the valve member is the fraction $x_2/X$. The relative stiffness of the two members thus establishes a proportionality relationship between the total displacement of the regulator assembly and the displacement of the loading means. The proportionality relationship above can be established merely by selection of springs or other resilient means of the appropriate stiffness coefficients since the following relationships hold true:

Since the springs are connected in tandem, at equilibrium the forces applied to each of them will be equal and, in accordance with Hooke's Law, $k_1 x_1 = k_2 x_2$. This relationship can be rewritten as $x_1 = k_2 x_2 / k_1$ and, from the previously mentioned ratio, $$X = x_2 \left( \frac{k_2 + 1}{k} \right)$$

According to a more specific feature of this invention, the valve means with its displaceable member, the relatively resilient means with the large stiffness coefficient and the resilient means with the relatively small stiffness coefficient are axially aligned along the generally cylindrical housing which is pivotally fastened at one extremity to the axle element while the other extremity receives a sliding abutment means and is pivotally connected to the chassis element. A reversed relationship of the ends of the housing is also possible. The sliding element serves to compress the resilient means which are conventional compression springs, as mentioned earlier, although chambers preloaded with fluids of different compressibility and pressures may also be employed. The member bearing upon the resilient assembly and hereinafter referred to as an abutment means, may be resiliently compressible itself and constituted in the form of a captive spring whose stiffness coefficient is in excess of that of the less-compressible coil spring, previously mentioned. The connecting means can then include a rod or the like, capable of further stressing the abutment means to supplement the vehicle suspension in one extreme position of the regulator assembly, although in the normal operative mode of the device, the abutment means compresses the tandem coil springs.

According to yet another feature of the present invention, I provide means for displacing the housing and valve relative to one or both of the suspension elements with a horizontal component of displacement so that a nonlinear and preferably sinusoidal relationship is established between the linear movement of the abutment against the tandem springs and a vertical relative displacement of the chassis and axle elements against the force of their resilient suspension means. Thus, the overall characteristics of the tandem-spring assembly can be substantially equivalent to, although the reverse of, the characteristic of the resilient suspension for the chassis. We have found, more particularly, that a sinusoidal relationship of this type can be achieved when the relative displacement of the housing and the abutment means has a horizontal component determined by the arcuate movement of the housing about a pivot fixed with respect to at least one of the suspension elements. Thus, when there is no relative horizontal displacement of the axle element and the chassis element, we employ a pair of articulated links, each of which is pivotally connected to one of these elements, while the housing is connected thereto at their articulation so that the housing describes a circular arc segment having a horizontal component of movement. Similarly, a horizontal component of relative displacement can be obtained when the resilient suspension includes a leaf spring or the like, permitting relative horizontal displacement of the axle and the chassis.

The above and other objects, features and advantages of the present invention will be more fully apparent from the following description, reference being made to the accompanying drawing in which:

FIGS. 1A and 1B are fragmentary views similar to FIG. 1 showing the regulator in its extreme positions;

FIG. 2 is a bottom view of the assembly, partly broken away;

FIG. 3 is a graph illustrating a principle of the invention; and

FIG. 4 is a view similar to FIG. 1 showing another embodiment of this invention.

Figure 1:
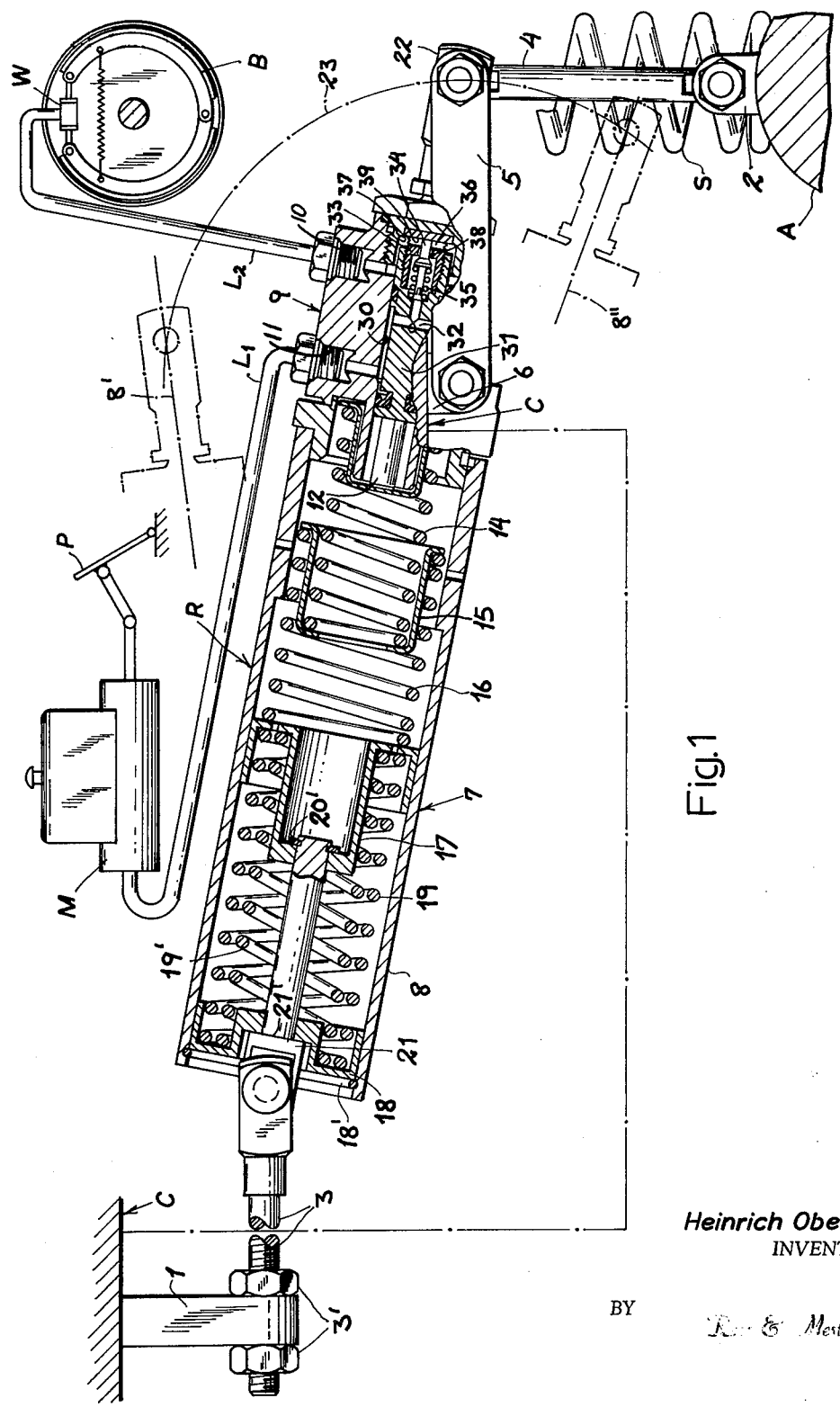
FIG. 1 is a side cross-sectional view, partly in section and partly in schematic form, illustrating a brake regulator according to this invention.

In FIGS. 1 and 2, I show a vehicle chassis generally designated C which is resiliently mounted upon the axles generally designated A of an automotive vehicle by, for example, a coil-spring suspension S which permits relative movement of the axles and the chassis in the vertical direction but restricts relative horizontal movement. The brake regulator R of the present system, as mentioned earlier, is responsive to the relative movement of the axle A and the chassis element C of the suspension system and is thus connected between the aforedescribed elements.

As described in my above-mentioned copending application, the brake system comprises, in the conventional manner, a master cylinder M whose piston can be linked to the brake pedal P in a conventional manner, the master cylinder having a fluid-transmission line $L_1$, connected to the inlet 11 of the valve 9 of the brake regulator. The outlet 10 of the latter is connected via the transmission line $L_2$ to the hydraulic cylinder W of the drum- or expansion-type wheel brake B whose brake shoes engage the drum of the brake under the fluid pressure in cylinder W to slow the vehicle. In general, it may be noted that a brake regulator may be provided for each of the wheel brakes of a truck or other heavy-duty vehicle, in which case line $L_1$ will supply the respective regulator valves in parallel; alternatively, a single regulator can be provided such that the output line $L_2$ will supply the wheel cylinders with hydraulic fluid in parallel. For convenience in illustrating the invention, the elements of the brake system, apart from the regulator R, have been shown in diagrammatic form. The chassis C is provided with a lug 1 to which a rod 3 is affixed by the clamping nuts 3' which permit linear adjustment of the rod 3 in the horizontal direction. The axle A has a pivot 2 at which a rigid arm 4 is swingably mounted, the arm 4 being articulated to a further arm 5 at the eye 22 of the regulator housing 7. At its other extremity, the arm 5 is pivoted to a lug 6 defining a fixed center of swing for the housing 7.

The brake regulator R includes the brake-pressure-control valve 9 (which may be of the type described in my copending application Ser. No. 217,609) and a pair of tandem-connected resilient means received within a cylindrical portion 8 of the regulator housing. The valve 9 includes a stepped bore 30 within which a differential piston 31 is axially shiftable, this piston being provided with a passage 32 enclosed by a cap 33 to define a chamber in which a poppet valve 34 is normally urged to the right (FIG. 1) by a coil spring 35. The cap 33 is slotted or otherwise formed with radial passages 36 to allow the fluid to flow into chamber 37 and pass through outlet 10 when the poppet valve 34 is held out of engagement with the seat 38. A surface 39 of the bore 30 forms an abutment for the poppet valve 34 so that, in an extreme right-hand position of differential piston 31, the valve 34 is held away from the seat 38. In this position, hydraulic fluid flows from inlet 11 through bore 30 and passage 32, past the seat 38 and around the clearance between the poppet valve and the cap into chamber 37, and thence to the wheel cylinders W via outlet 10 and line $L_2$. When, however, the differential piston 31 is shifted to the left, the poppet valve 34 is retracted from the abutment 39 and closes under the action of spring 35 to prevent fluid flow through the passage 32. In this condition of the valve, the differential piston 31 acts as a pressure-transfer means, as described hereinafter. The differential piston 31 is further provided with a control shank 12 extending axially into the cylindrical housing portion 8.

Within housing portion 8, a plate 13 bears upon the shank 12 and forms a seat for a coil spring 14 having a high stiffness coefficient and constituting one of the tandem resilient means. The other end of the coil spring 14 bears upon a cup-shaped plate 15, being seated in the interior thereof. The plate 15 coaxially projects into and engages a second coil spring 16 having a relatively low stiffness coefficient and constituting the other resilient means of the tandem pair.

The coil spring 16 rests against an axially shiftable abutment means 17 whose position is controlled by the relative movement of the bar 3 and the housing 7 of the regulator. While excellent results are obtained when the slidable member 17 is rigidly secured to the link 20 extending axially into the cylindrical housing portion 8, link 20 being pivotally connected at 21 with the rod 3, it has been found advantageous to provide a somewhat yielding abutment whose stiffness is, however, far in excess of the stiffness of spring 14.

It is, therefore, a feature of the present invention that the abutment member 17 be axially shiftably relative to its link 20 and the rod 3 against the force of a captive and preloaded spring system operated by the coaxial coil springs 19, 19′. A ring 20′ prevents release of the abutment member 17 and the expansion of springs 19 and 19′. At their other extremities, the springs bear upon another axially slidable member 18 which is held by the spring force against the shoulder 21′ of the pivot 21. When, however, the link 20 is withdrawn from the housing portion 8 as when the wheels and axle move away from the chassis, the slidable member 18 is immobilized by a ring 18′ inserted into an annular groove at the left-hand end of the housing 7. It will be understood that relative axial movement of the link 20 and the housing portion 8 in such manner as to compress the springs 16 and 14 will first result in entrainment of member 18 to the right by the shoulder 21′ and the consequent movement without further compression (as represented by decrease of length) of the springs 19 and 19′ of abutment member 17 to load the springs 14 and 16. It is only when a possible sudden force is applied to these springs of sufficient magnitude (e.g. as a result of sudden engagement of the wheels with a hilly portion of road in a heavily loaded condition of the vehicle) to compress them substantially completely that member 17 and its springs 19, 19′ will yield. When the member 20 is withdrawn from the housing portion, the engagement of abutment 18 with ring 18′ will permit ring 20′ to draw member 17 further to the left to increase the load upon springs 19 and 19′ and relax any remaining pressure upon springs 14 and 16.

As previously noted, the lug 6 forms a fixed fulcrum or center for arcuate movement (dot-dash line 23) of the housing as represented by the position of the eye 22. The extreme positions of the regulator R are illustrated in dot-dash lines in FIG. 1 but in solid lines in FIGS. 1A and 1B, the axis positions in each case being designated by the reference numerals 5′ and 5″, respectively.

With the regulator R in the position shown in FIG. 1, the shank 12 of differential piston 31 is in an intermediate condition of loading by the springs 16 and 14. When the brake pedal P is depressed, hydraulic fluid under pressure flows from the master cylinder M over the line $L_1$ into the bore 30 and thence through the passage 32, past the valve seat 38 into chamber 37. Since the surface area of the piston 31, exposed to fluid pressure in chamber 37, is greater than that exposed to fluid pressure in bore 30, a differential force is applied to the piston tending to move it to the left against the force of the springs 16 and 14. As the pressure applied via the master cylinder M increases, the passage between the poppet valve 34 and the valve seat gradually closes and, upon such closure, further application of pressure results in a transmission of force in inverse relationship to the effective areas on both sides of the piston. The rate at which the pressure applied to the wheel cylinder thus decreases relative to the rate of increase of the pressure on the left-hand side of the piston 31. The point at which the poppet valve closes is determined by the restoring force of springs 16 and 14 which, in turn, is determined by the degree of preloading of these springs corresponding to the vehicle load. In the loaded condition of the vehicle (FIG. 1A), the springs 16 and 14 are compressed to a greater extent and the hydraulic pressure necessary to displace the differential piston 31 to the left is considerably greater. The axial compression of the springs 16 and 14 are, of course, unequal and determined by their stiffness ratio, as discussed earlier. Thus, by a selection of relative spring stiffness, it is possible to accommodate any desired mechanical stroke of member 17 relative to the valve 9 to an optimum displacement or compression of spring 14 to effect a predetermined resistance to the displacement of the control element 12, 31. When the brake pressure is released, piston 31 is held away from the abutment 39 until the pressure differential across the poppet valve is sufficient to bias it to the left and discharge hydraulic fluid from the wheel cylinders to the master cylinder and eventually permit the movement of piston 31 to the right under the force of springs 14 and 16 until the poppet valve 34 again engages the abutment.

Since the regulator R swings along the arc 23 about the center of lug 6 and with a radius determined by the length of arm 5, a horizontal component of movement is imparted to the regulator R and the axial movement of abutment member 17 within the cylinder takes place in accordance with a sine relationship with respect to the relative vertical movement of the chassis C and the axis A. Thus, the characteristic of the tandem springs with respect to the relative displacement (in vertical direction) of the axle and chassis inversely approaches or equals the progressive characteristics of the spring suspension of the vehicle. This relationship is shown for an embodiment of the invention in the graph of FIG. 3. In this graph the characteristic of the automotive suspension is shown in broken lines, while the characteristic of the regular spring assembly (i.e. the tandem springs 14 and 16) is shown in solid lines. The graph plots the linear movement of the vehicle suspension (abscissa) against the loading of the vehicle suspension and the control movement of the member 17 (ordinates) within the regulator. It will be apparent that the two characteristics are substantially equivalent.

In the lower extreme position of the regulator (FIG. 1B) member 20 is somewhat retracted and the springs 19, 19′ become effective. This condition preferably arises when the vehicle is jacked up, in which case the springs 19, 19′ tend to support the axle, thereby supplementing the usual suspension system. When the vehicle is in its normal operating condition, the spring assembly 17, 18, 19, 19′ functions as a rigid member, as previously described.

In FIG. 4, I show another embodiment of the invention in which the articulated-arm assembly for permitting displacement of the regulator 5 with respect to the chassis element C′ and/or the axle element A′ is omitted although other means are provided for this purpose. It has been found that a similar relationship between the suspension characteristic and the control movement of the regulator can be accomplished when the regulator R′ is pivotally mounted at its eye 22′ to an element of the axle A′, especially the differential housing D, while the bar 3 affixed to the chassis C′ is fastened, as described with reference to FIGS. 1 and 2. In this case, however, means are provided for permitting relative axial displacement of the axle A′, and its differential D and the chassis C′, such means including, for example, a leaf-spring suspension S′, the leaf springs being secured at C″ to the chassis and having the axle portion A″ mounted thereon in such manner as to be shiftable along the leaf springs. The leaf springs are, in the usual manner, aligned in the direction of the longitudinal axis of the automotive vehicle and its general direction of travel. It will be evident that relative horizontal movement of the axle and chassis, when the regulator is swingable about a center fixed with respect to one of these elements of a suspension, can be afforded by a slide member 40 by means of which the axle portion A″ is mounted on the leaf spring S″. Similarly, the attachment means 41 by which the leaf spring is secured to the chassis may permit the longitudinal movement, or some other guide means for such longitudinal movement can be provided. As the load increases, there is, in addition to the vertical component of relative displacement, a horizontal component capable of yielding the relationship between the control movement and the suspension movement previously described.

The invention described and illustrated is believed to admit of many modifications within the ability of persons skilled in the art, all such modifications being considered within the spirit and scope of the appended claims.

I claim:

1. A brake regulator for a fluid-operated brake system having a master brake cylinder and wheel cylinders of an automotive vehicle having a chassis displaceable relative to an axle upon loading of the vehicle to a variable extent, said regulator comprising valve means for controlling the transmission of fluid pressure in said brake system from said master cylinder to said wheel cylinders and including at least one valve member linearly shiftable in response to fluid pressure generated by said master cylinder; said valve member forming a pressure-transmitting piston interposed between said brake cylinder and said wheel cylinders and having a valved passage for transmission of fluid therebetween in at least some operative positions of said member; a pair of tandem-disposed resilient means bearing upon said valve member and of different stiffness; at least one abutment means linearly shiftable in response to changes in the relative positions of said chassis and said axle and bearing upon the tandem-disposed pair of resilient means for stressing same, said pair of resilient means consisting of a pair of coaxial coil compression springs aligned with said abutment means and said valve member in the direction of linear displacement thereof and intermediate said abutment means and said valve member, the coil spring proximal to said valve member having a stiffness greater than that of the coil spring distal from said valve member whereby the total linear stroke of said abutment means relative to said valve means equals the sum of the axial compressions of said coil springs, said coil springs being axially compressed upon relative displacement of said abutment means and said valve means in inverse relationship to the respective stiffness coefficients; common housing means for said abutment means, said coil springs and said valve means; and a pair of connecting members respectively mounted on said abutment means and said housing, one of said connecting members being pivotally joined to said chassis, the other of said connecting members being pivotally joined to said axle; and means including said connecting members for effecting relative displacement of said housing and at least one of said axle and said chassis whereby the tandem coil springs are loaded by said abutment means with a characteristic relative to the loading of said vehicle, in substantially inverse relationship with the characteristic of the vehicle suspension.

2. A brake regulator for a fluid-operated brake system of an automotive vehicle having a chassis displaceable relative to an axle upon loading of the vehicle to a variable extent, said regulator comprising valve means for controlling the transmission of fluid pressure in said brake system and including at least one valve member linearly shiftable in response to fluid pressure; a pair of tandem-disposed resilient means bearing upon said valve member and of different stiffness; at least one abutment means linearly shiftable in response to changes in the relative positions of said chassis and said axle and bearing upon the tandem-disposed pair of resilient means for stressing same, said pair of resilient means consisting of a pair of coaxial coil compression springs aligned with said abutment means and said valve member in the direction of linear displacement thereof and intermediate said abutment means and said valve member, the coil spring proximal to said valve member having a stiffness greater than that of the coil spring distal from said valve member whereby the total linear stroke of said abutment means relative to said valve means equals the sum of the axial compressions of said coil springs, said coil springs being axially compressed upon relative displacement of said abutment means and said valve means in inverse relationship to the respective stiffness coefficients; common housing means for said abutment means, said coil springs and said valve means, and a pair of connecting members respectively mounted on said abutment means and said housing, one of said connecting members being pivotally joined to said chassis, the other of said connecting members being pivotally joined to said axle; and means including said connecting members for effecting relative displacement of said housing and at least one of said axle and said chassis whereby the tandem coil springs are loaded by said abutment means with a characteristic relative to the loading of said vehicle, in substantially inverse relationship with the characteristic of the vehicle suspension, said connecting members defining a fixed center of swing for said housing means with respect to one of said chassis and said axle.

3. A brake regulator as defined in claim 2 wherein one of said connecting members includes a pair of articulate arms pivotally connected at their free extremities to said axle and said chassis and pivotally joined at their articulation to said housing means, the arm interconnecting said housing means and said chassis defining the radius of swing of said housing means about said center and being dimensioned to impart a linear movement to said abutment means in sinusoidal relationship to relative movement of said chassis and said axle.

4. A brake regulator as defined in claim 2, further comprising suspension means between said axle and said chassis permitting relative horizontal displacement of said axle and said chassis generally in the direction of said linear displacement.

5. A brake regulator as defined in claim 2 wherein said abutment means includes a spring-loaded element engageable by the respective connecting member and stressable against said housing means in an extreme condition of separation of said axle and said chassis.

6. A brake system for an automotive vehicle having a chassis element, an axle element and suspension-spring means resiliently supporting said chassis element upon said axle element and defining therewith a vehicle suspension, said brake system comprising: a master cylinder operable to displace a braking fluid; at least one wheel-brake means actuatable by said fluid; and a brake regulator responsive to relative displacement of said chassis element and said axle element in response to variable load conditions of said vehicle and interposed between said master cylinder and said wheel-brake means for controlling fluid transmission from said master cylinder to said wheel-brake means, said brake regulator including valve means forming a fluid path between said master cylinder and said wheel-brake means and having a longitudinally shiftable valve member for controlling transmission of fluid along said path, a pair of resilient means of different stiffness bearing upon said member in tandem, and abutment means displaceable relatively to said member upon relative movement of said axle element and said chassis element and bearing upon said resilient means in tandem for stressing same, said pair of resilient means consisting of a pair of coaxial coil compression springs aligned with said abutment means and said valve member in the direction of linear displacement thereof and intermediate said abutment means and said valve member, the coil springs proximal to said valve member having a stiffness greater than that of the coil spring distal from said valve member whereby the total linear stroke of said abutment means relative to said valve means equals the sum of the axial compression of said coil springs, said coil springs being axially compressed upon relative displacement of said abutment means and said valve means in inverse relationship to the respective stiffness coefficients, said valve means including a valve body provided with a longitudinally extending bore substantially coaxial with said coil springs, said valve member being reciprocable within said bore, said body being further provided with an inlet and an outlet for hydraulic fluid communicating with said bore at axially spaced locations therealong, said valve member being constituted as a differential piston having a relatively large surface area exposed to fluid pressure at said outlet and effective to urge said valve member axially against the force of said coil springs, and a relatively small effective surface area exposed to fluid pressure at said inlet and effective in the opposite direction, said valve member being provided with a passage interconnecting said inlet and said outlet, and further valve means in said passage and effective upon displacement of said valve member against the force of said coil springs upon an increase in fluid pressure supplied to said bore for closing said passage, said system further comprising conduit means connecting said inlet with said master cylinder and said outlet with said wheel-brake means; and a cylindrical housing portion rigid with said valve body and receiving said coil springs and said abutment means, said valve member having a shank projecting from said body into said housing portion, said resilient means including a first plate forming a seat for the coil spring proximal to said valve member and bearing upon said shank and a second plate engaged by an extremity of the proximal coil spring and forming a seat for the distal coil spring, said abutment means including an elongated member secured to one of said elements and extending into said housing portion remote from said body and a third plate slidable relatively to said elongated member and bearing upon said distal spring remote from said second plate, said abutment means further including captive-spring means urging said third plate against said coil springs with a stiffness in excess of that of said coil springs and engageable with said housing portion for yieldably resisting withdrawal of said elongated member from said housing portion.

7. A brake system as defined in claim 6 wherein said suspension-spring means substantially prevent relative horizontal displacement of said elements, said system further comprising a pair of articulated arms pivotally secured at their free extremities to said elements, respectively, and at their articulation to said valve body, said abutment means being connected with said chassis element whereby said valve body and said housing portion describe an arcuate movement upon relative vertical displacement of said elements.

8. A brake system as defined in claim 6 wherein said axle element is a differential housing mounted upon the axle of the vehicle.

9. A brake system as defined in claim 8, further comprising means for interconnecting said suspension-spring means and at least one of said elements with at least limited freedom of relative displacement horizontally in the general direction of shiftability of said valve member.

References Cited by the Examiner
UNITED STATES PATENTS

| | | | |
|---|---|---|---|
| 1,807,132 | 5/1931 | Pappas et al. | 267—60 |
| 2,991,797 | 7/1961 | Baldwin | 303—6 X |
| 3,153,560 | 10/1964 | Henry-Biabaud | 303—60 X |

BENJAMIN HERSH, *Primary Examiner.*

EUGENE G. BOTZ, A. HARRY LEVY, *Examiners.*

M. S. SALES, *Assistant Examiner.*